US010812202B2

(12) United States Patent
Nagaraja et al.

(10) Patent No.: US 10,812,202 B2
(45) Date of Patent: Oct. 20, 2020

(54) RESOURCES FOR CHANNEL MEASUREMENTS

(71) Applicant: QUALCOMM Incorporated, San Diego, CA (US)

(72) Inventors: Sumeeth Nagaraja, San Diego, CA (US); Tao Luo, San Diego, CA (US); Muhammad Nazmul Islam, Edison, NJ (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/143,799

(22) Filed: Sep. 27, 2018

(65) Prior Publication Data

US 2019/0103928 A1    Apr. 4, 2019

Related U.S. Application Data

(60) Provisional application No. 62/567,181, filed on Oct. 2, 2017.

(51) Int. Cl.
*H04B 17/309* (2015.01)
*H04L 25/02* (2006.01)
(Continued)

(52) U.S. Cl.
CPC .......... *H04B 17/309* (2015.01); *H04B 7/063* (2013.01); *H04B 7/0695* (2013.01); *H04L 5/005* (2013.01);
(Continued)

(58) Field of Classification Search
CPC .... H04B 17/309; H04B 7/063; H04B 7/0695; H04B 17/345; H04B 17/318;
(Continued)

(56) References Cited

U.S. PATENT DOCUMENTS 9,510,339 B2 * 11/2016 Seo ........................ H04B 17/00
10,128,927 B2 * 11/2018 Einhaus ............... H04B 7/0626
(Continued)

FOREIGN PATENT DOCUMENTS

WO    WO-2013025558 A1    2/2013
WO    WO-2017136749 A1    8/2017

OTHER PUBLICATIONS

International Search Report and Written Opinion—PCT/US2018/053641—ISA/EPO—dated Jan. 11, 2019 (180116WO).
(Continued)

*Primary Examiner* — Sharad Rampuria
(74) *Attorney, Agent, or Firm* — Linda G. Gunderson; QUALCOMM IP DEPT.

(57) ABSTRACT

Methods, systems, and devices for wireless communications are described. A base station may identify resources associated with a beamformed signal, the identified resources being used by a user equipment (UE) for channel measurements of the beamformed signal, the beamformed signal being one of a plurality of beamformed signals. The base station may generate a signal indicating at least a portion of the identified resources and transmit the signal to the UE. The UE may receive the signal and perform a channel measurement of the beamformed signal using the indicated resources. The UE may transmit, to the base station, a measurement report comprising the channel measurement associated with the beamformed signal.

28 Claims, 15 Drawing Sheets

(51) Int. Cl.
*H04B 7/06* (2006.01)
*H04L 5/00* (2006.01)
*H04B 17/318* (2015.01)
*H04B 17/345* (2015.01)

(52) U.S. Cl.
CPC ........ *H04L 25/0204* (2013.01); *H04B 7/0617* (2013.01); *H04B 17/318* (2015.01); *H04B 17/345* (2015.01)

(58) Field of Classification Search
CPC ........ H04B 7/0617; H04B 3/46; H04B 17/00; H04L 5/005; H04L 25/0204; H04L 43/00; H04L 43/50; H04W 24/00

See application file for complete search history.

(56) References Cited

U.S. PATENT DOCUMENTS

| | | |
|---|---|---|
| 2012/0082052 A1 | 4/2012 | Oteri et al. |
| 2016/0323029 A1* | 11/2016 | Cheng .................. H04B 7/0695 |
| 2017/0111098 A1 | 4/2017 | Kim et al. |
| 2019/0044599 A1* | 2/2019 | Kakishima ........... H04B 17/327 |
| 2019/0074883 A1* | 3/2019 | Park ...................... H04W 24/10 |

OTHER PUBLICATIONS

QUALCOMM Incorporated: "Radio Link Monitoring Consideration", 3GPP DRAFT; R1-1716386 Radio Link Monitoring Consideration, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051339841, Retrieved from the Internet: URL:http://www.3gpp.org/ftp/Meetings_3GPP_SYNC/RAN1/Docs/ [retrieved on Sep. 17, 2017], 10 pages.

* cited by examiner

RESOURCES FOR CHANNEL MEASUREMENTS

CROSS REFERENCES

The present Application for Patent claims the benefit of U.S. Provisional Patent Application No. 62/567,181 by NAGARAJA, et al., entitled "RESOURCES FOR CHANNEL MEASUREMENTS," filed Oct. 2, 2017, assigned to the assignee hereof, and expressly incorporated herein.

BACKGROUND

The following relates generally to wireless communication, and more specifically to resources for channel measurements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Millimeter wave wireless communication systems, while promising, present new challenges. For example, beamformed transmissions may have varying beam configurations such that each beam may have a different beam width, a different beam direction, etc. Generally, a narrow beam width may have a relative deep, but narrow coverage area whereas a wider beam width may have a relative shallow, but wide coverage area. The "coverage area" (or footprint) within the context of a beamformed transmission may vary from one transmission to the next. Base stations may use a variety of beamformed transmissions, e.g., reference signals, system information signals, and the like. Each beamformed transmission, however, may use different resources, in which the resources may change for each transmission. This may present difficulties for UE attempting to locate, receive, and/or measure the beamformed transmissions.

SUMMARY

The described techniques relate to improved methods, systems, devices, or apparatuses that support resources for channel measurements. Generally, the described techniques provide for a base station to transmit an indication to a user equipment (UE) of which resources (e.g., time, frequency, beam, etc.) the UE can use for channel measurements (e.g., interference measurements, and the like). In particular, aspects of the described techniques provide for the manner in which the resource information is specified or otherwise communicated to the UE. The resource information and associated channel measurements may support beam management, mobility, and the like. As one example, a base station may have a plurality of beamformed signals available, e.g., synchronization signals, reference signals, and the like. Some or all of the available beamformed signals may use different resources, e.g., time, frequency, quasi co-location (QCL) information, and the like. The base station may identify the resources for some or all of the available beamformed signals and generate a signal that carries or otherwise conveys an indication of the resources. The base station may transmit the signal to the UE and the UE may use the indicated resources to identify which beamformed signals are to be used for channel measurements. The UE may perform the channel measurements using the indicated resources and transmit a measurement report to the base station based at least in part on the channel measurements.

A method of wireless communication is described. The method may include identifying resources associated with a beamformed signal, the identified resources being used by a UE for channel measurements of the beamformed signal, the beamformed signal being one of a plurality of beamformed signals, generating a signal indicating at least a portion of the identified resources, and transmitting the signal to the UE.

An apparatus for wireless communication is described. The apparatus may include means for identifying resources associated with a beamformed signal, the identified resources being used by a UE for channel measurements of the beamformed signal, the beamformed signal being one of a plurality of beamformed signals, means for generating a signal indicating at least a portion of the identified resources, and means for transmitting the signal to the UE.

Another apparatus for wireless communication is described. The apparatus may include a processor, memory in electronic communication with the processor, and instructions stored in the memory. The instructions may be operable to cause the processor to identify resources associated with a beamformed signal, the identified resources being used by a UE for channel measurements of the beamformed signal, the beamformed signal being one of a plurality of beamformed signals, generate a signal indicating at least a portion of the identified resources, and transmit the signal to the UE.

A non-transitory computer-readable medium for wireless communication is described. The non-transitory computer-readable medium may include instructions operable to cause a processor to identify resources associated with a beamformed signal, the identified resources being used by a UE for channel measurements of the beamformed signal, the beamformed signal being one of a plurality of beamformed signals, generate a signal indicating at least a portion of the identified resources, and transmit the signal to the UE.

Some examples of the method, apparatus, and non-transitory computer-readable medium described above may further include processes, features, means, or instructions for receiving, based at least in part on the identified resources, a measurement report associated with the beamformed signal.

Some examples of the method, apparatus, and non-transitory computer-readable medium described above may further include processes, features, means, or instructions for identifying a receive beam of the UE used for receiving a previous beamformed signal. Some examples of the method, apparatus, and non-transitory computer-readable medium described above may further include processes, features, means, or instructions for generating the signal to indicate the receive beam, wherein the identified resources comprise the receive beam.

Some examples of the method, apparatus, and non-transitory computer-readable medium described above may further include processes, features, means, or instructions for generating at least one of: a system information signal, or a radio resource control (RRC) signal, a handover message, or combinations therefore, as the signal indicating at least a portion of the identified resources.

Some examples of the method, apparatus, and non-transitory computer-readable medium described above may further include processes, features, means, or instructions for configuring at least one of: a media access control (MAC) control element (CE), or a downlink control information (DCI), or combinations thereof, to enable the channel measurements by the UE using the identified resources.

Some examples of the method, apparatus, and non-transitory computer-readable medium described above may further include processes, features, means, or instructions for applying a mask to a bit or field in the signal to indicate the identified resources.

Some examples of the method, apparatus, and non-transitory computer-readable medium described above may further include processes, features, means, or instructions for determining that a measurement report received from the UE comprises an interference level satisfying a threshold for a subset of resources, wherein the identified resources may be based at least in part on the subset of resources.

Some examples of the method, apparatus, and non-transitory computer-readable medium described above may further include processes, features, means, or instructions for identifying a set of resources associated with one or more neighboring base stations located proximate to the UE. Some examples of the method, apparatus, and non-transitory computer-readable medium described above may further include processes, features, means, or instructions for generating the signal to indicate the set of resources.

Some examples of the method, apparatus, and non-transitory computer-readable medium described above may further include processes, features, means, or instructions for coordinating with the one or more neighboring base stations to identify the set of resources.

In some examples of the method, apparatus, and non-transitory computer-readable medium described above, the identified resources comprise at least one of: a time resource, or a frequency resource, or a time-frequency resource, or a bandwidth resource, or specifying a QCL information, or a system frame number (SFN), or a slot index, or a symbol index, or a measurement window, or combinations thereof.

In some examples of the method, apparatus, and non-transitory computer-readable medium described above, the identified resources may be associated with at least one of: a physical downlink control channel (PDCCH) region, or a physical downlink shared channel (PDSCH) region, or a physical uplink control channel (PUCCH) region, or a physical uplink shared channel (PUSCH) region, or a combination thereof, of a transmission.

A method of wireless communication is described. The method may include receiving a signal from a base station indicating resources for a beamformed signal within a plurality of beamformed signals, performing a channel measurement of the beamformed signal using the indicated resources, and transmitting, to the base station, a measurement report comprising the channel measurement associated with the beamformed signal.

An apparatus for wireless communication is described. The apparatus may include means for receiving a signal from a base station indicating resources for a beamformed signal within a plurality of beamformed signals, means for performing a channel measurement of the beamformed signal using the indicated resources, and means for transmitting, to the base station, a measurement report comprising the channel measurement associated with the beamformed signal.

Another apparatus for wireless communication is described. The apparatus may include a processor, memory in electronic communication with the processor, and instructions stored in the memory. The instructions may be operable to cause the processor to receive a signal from a base station indicating resources for a beamformed signal within a plurality of beamformed signals, perform a channel measurement of the beamformed signal using the indicated resources, and transmit, to the base station, a measurement report comprising the channel measurement associated with the beamformed signal.

A non-transitory computer-readable medium for wireless communication is described. The non-transitory computer-readable medium may include instructions operable to cause a processor to receive a signal from a base station indicating resources for a beamformed signal within a plurality of beamformed signals, perform a channel measurement of the beamformed signal using the indicated resources, and transmit, to the base station, a measurement report comprising the channel measurement associated with the beamformed signal.

Some examples of the method, apparatus, and non-transitory computer-readable medium described above may further include processes, features, means, or instructions for transmitting a previous measurement report identifying a receive beam used for measurements on the beamformed signal, wherein the signal comprises an indication of the receive beam.

Some examples of the method, apparatus, and non-transitory computer-readable medium described above may further include processes, features, means, or instructions for performing, based at least in part on the signal, the channel measurement on at least one beamformed signal from or more neighboring base stations.

Some examples of the method, apparatus, and non-transitory computer-readable medium described above may further include processes, features, means, or instructions for determining, based at least in part on the channel measurement, that an interference level of the beamformed signal exceeds a threshold. Some examples of the method, apparatus, and non-transitory computer-readable medium described above may further include processes, features, means, or instructions for omitting an indication of the interference level from the measurement report.

DETAILED DESCRIPTION

Figure 1:
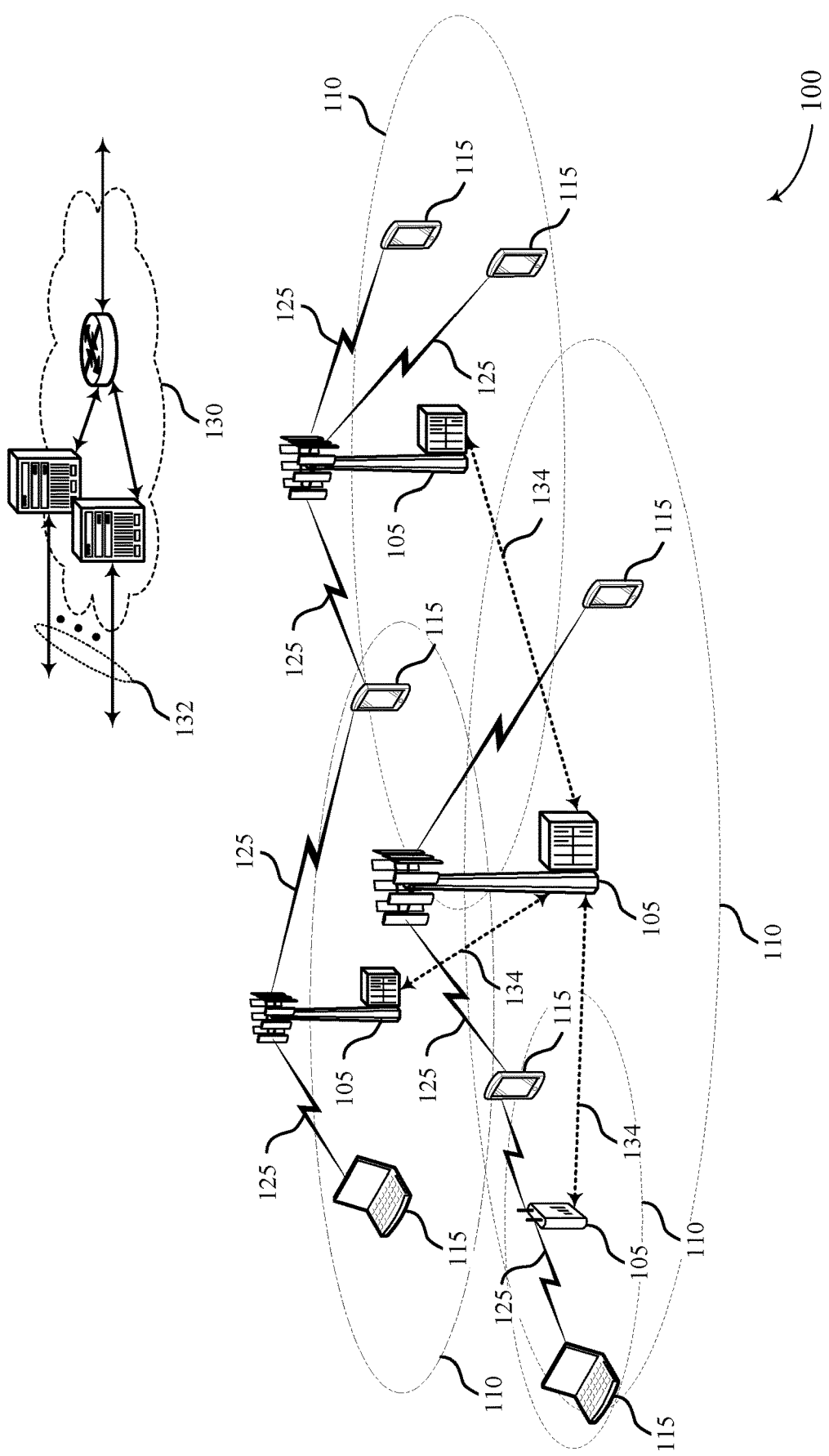
FIG. 1 illustrates an example of a system for wireless communication that supports resources for channel measurements in accordance with aspects of the present disclosure.

Next generation wireless communication systems may rely on millimeter wave (mmW) communication technologies. mmW technologies typically use beamformed transmissions/receptions to provide directional communications. Each beamformed transmission/reception may have an associated beam configuration, such as a beam width, a beamforming configuration, a beam shape, and the like. A beam configuration may refer to a digital/analog antenna configuration that provides a directional transmission towards a receiving device, such as a user equipment (UE). A receive beam may refer to a digital/analog antenna configuration that provides directional reception of a beam from a transmitting device. A transmit beam may refer to a digital/analog antenna configuration that provides directional transmission of a beam from the transmitting device. For a beam pair used for wireless communications, the transmit beam may be the same as or different from the receive beam (e.g., due to beam reflection, diffraction, and the like).

Moreover, certain beamformed transmissions may include the use of quasi co-location (QCL) information with respect to the transmitting device. Generally, two or more antenna ports may be considered QCL if the large-scale properties of the channel over which a symbol on one antenna port is conveyed can be inferred from the channel over which a symbol on the other antenna port is conveyed. In some aspects, the large-scale properties may include one or more (alone or in any combination) of a delay spread, a Doppler spread, a Doppler shift, an average gain, an average delay, an angle of departure, an angle of arrival, and the like.

mmW wireless communication systems present unique challenges with respect to interference management, medium access, and the like. For example, the directionality of transmissions and/or receptions prove a certain level of interference isolation in mmW systems. mmW communications present unique challenges with respect to high path loss. mmW wireless communication systems may use techniques such as hybrid beamforming (analog and digital) for beamformed signals. Hybrid beamforming may create narrow beam patterns that can enhance link budget/signal-to-noise ratio (SNR). For beam management, layer 3 (L3) mobility, etc., in both a radio resource control (RRC) connected or idle mode, the UE may need to measure the signal quality of one or more beams and report the signal quality to the base station.

Aspects of the disclosure are initially described in the context of a wireless communications system. Aspects of the described techniques provide for identification and indication of which resources a UE is to use for channel measurements and, in some aspects, how the indication of the resources is provided to the UE. For example, the base station may identify resources that are allocated to, or otherwise for, a beamformed signal. The beamformed signal may be one of a plurality of beamformed signals, e.g., in a multi-signal scenario such as a mmW wireless communication system. The base station may configure or otherwise generate a signal (e.g., a message) to carry or otherwise convey an indication of the resources and transmit the signal to the UE. The UE may receive the signal and use the indication to identify the resources for the beamformed signal. The UE may use the beamformed signal to perform a channel measurement and transmit a measurement report back to the base station.

Aspects of the disclosure are further illustrated by and described with reference to apparatus diagrams, system diagrams, and flowcharts that relate to resources for channel measurements.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may identify resources associated with a beamformed signal. The identified resources may be used by a UE 115 for channel measurements of the beamformed signal. The beamformed signal may be one of a plurality of beamformed signals. The base station 105 may generate a signal indicating at least a portion of the identified resources. The base station 105 may transmit the signal to the UE 115.

A UE 115 may receive a signal from a base station 105 indicating resources for a beamformed signal within a plurality of beamformed signals. The UE 115 may perform a channel measurement of the beamformed signal using the indicated resources. The UE 115 may transmit, to the base station 105, a measurement report comprising the channel measurement associated with the beamformed signal.

Figure 2:
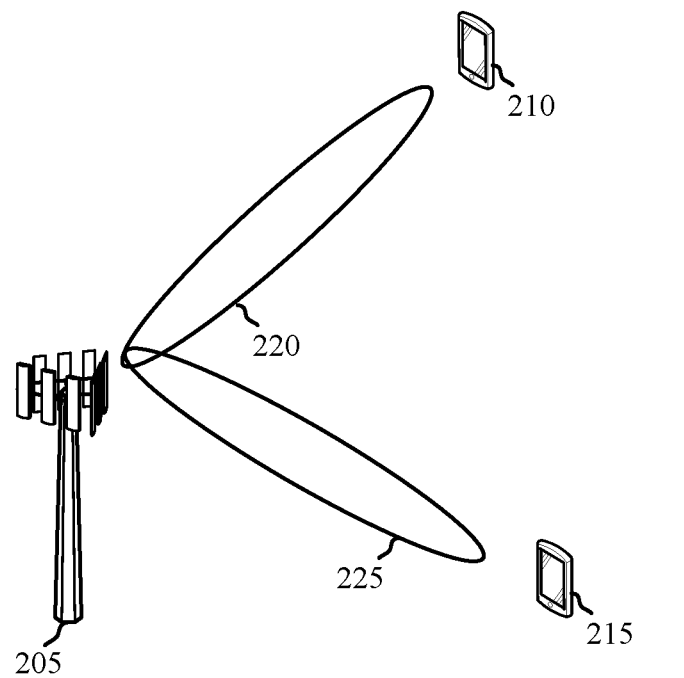
FIG. 2 illustrates an example of a system for wireless communication that supports resources for channel measurements in accordance with aspects of the present disclosure.

FIG. 2 illustrates an example of a wireless communication system 200 that supports resources for channel measurements in accordance with various aspects of the present disclosure. In some examples, wireless communication system 200 may include a base station 205 and UEs 210 and 215, which may be examples of the corresponding devices described herein. Wireless communication system 200 may be a mmW wireless communication system.

Generally, base station 205 may be associated with UEs 210 and 215. For example, base station 205 may communicate with UE 210 using beam configuration 220 and communicate with UE 215 using beam configuration 225. Beam configurations 220 and/or 225 may broadly refer to beamformed transmissions, wherein each beam configuration may include a transmit beam and/or a receive beam (e.g., a beam pair link).

Broadly, base station 205 may, for each of UEs 210 and 215, identify resources associated with a beamformed signal. The identified resources may be used by a UE for channel measurements of the beamformed signal. The beamformed signal may be one of a plurality of beamformed signals. The base station 205 may generate a signal indicating at least a portion of the identified resources. The base station 205 may transmit the signal to the UEs, e.g., in separate transmissions to UE 210 and to UE 215. One or both of UEs 210 and 215 may receive the signal from the base station 205 indicating the resources and use this information to identify or otherwise determine which resources are being used for the beamformed signal. One or both of UEs 210 and 215 may perform channel measurements on the beamformed signal and provide a channel measurement report to the base station 205.

In some aspects, the beamformed signal may include a reference signal, such as a NR synchronization signal (SS) (e.g., NR primary SS (PSS), NR secondary SS (SSS), demodulation reference signal (DMRS) associated with a physical broadcast channel (PBCH)), a channel state information reference signal (CSI-RS), or any other reference signals. Base station 205 may provide an indication of time, frequency and QCL resources for UEs 210 and/or 215 to use for the channel measurement, e.g., measurement of a reference signal received quality (RSRQ), reference signal signal-to-interference and noise ratio (RS-SINR), and the like. Base station 205 may provide the indication of the resources (e.g., configuration information) as part of a system information, random mobile subscriber identity (RMSI), system information message, RRC message, and the like.

In some aspects, aspects of the described techniques may include a 'MeasObjectNR' information element (UE). The IE may show that the network configures the UE 210 with resources for channel measurements. On top of that, a SSB-to-Measure IE may be used to show that base station 205 is providing a bitmap of the indices of actually transmitted SSBs, which may be transmitted towards different directions. In some aspects, the CSI-RS-configMobility IE (which may be called from the 'MeasObjectNR' IE) may contain the SSB index that is QCLd with this CSI-RS (this means that the CSI-RS and the corresponding QCLd SSB are "transmitted with a similar beam" and can be received with the same UE receive beam).

In some aspects, base station 205 may dynamically enable/disable the UE(s) to perform/refrain from performing the channel measurements using the indicated resources using MAC control element (MAC-CE), downlink control information (DCI), and the like. For example, base station 205 may configure or otherwise select bit(s) or a field of the MAC-CE, DCI, etc., to convey the enablement indication.

In some aspects, base station 205 may provide a mask to indicate the resources for the UE 210 and/or 215 to use for the channel measurements, e.g., RSSI or interference measurements. For example, base station 205 may apply the mask associated with the identified resources over one or more bit(s), fields, etc., in the signal to convey the indication. The mask may indicate the system frame number (SFN), the slot index, the symbol index, and the like for the channel measurements. The identified resource may include a time period such as during a measurement gap (e.g., SS/PBCH Block Measurement Time Configuration (SMTC) window) or configured outside the measurement gap window. In some aspects, the indication of the resources (e.g., the applied mask) may specify or otherwise indicate a bandwidth parameter, e.g., the bandwidth part or frequency resources of the beamformed signal.

In some aspects, base station 205 may provide a mask for channel measurements that are common to a subset of reference signal resource(s). For example, the indication of the resources may be for NR-SS blocks, CSI-RS resource(s), etc.

In some aspects, the resource for the beamformed signal may include time resources occurring in data or control region (e.g., PDCCH, PDSCH, PUSCH, PUCCH). In some aspects, the indication of the resources for the beamformed signal may include a subset of SS-blocks where the UE has measured RSRP greater than a configured threshold, in a subset of SS-blocks where the UE has measured RSRP less than a configured threshold, and the like. In some aspects, the indication of the resources may include frequency resources for channel measurements that may be in the same bandwidth (bandwidth part) as the RSRP measurements, over a different bandwidth (bandwidth part) as the RSRP measurements, and the like.

In some aspects, base station 205 may provide one or more masks (SFN, symbol index, slot index, etc.) indicating resources to be used by UEs 210 and/or 215 for channel measurements of neighbor cells, e.g., neighboring base stations. In this context, the timing reference may be of serving base station 205 and/or neighbor base station(s). In some aspects, the timing reference may be for a serving base station (e.g., base station 205) in a synchronized system and for the serving and neighboring base station(s) in a non-synchronized system. The masks may be selected using the DCI, MAC-CE, and the like.

In some aspects, base station 205 may coordinate between neighboring base station(s) with respect to downlink/uplink scheduling for corresponding time blocks to support the channel measurements.

In some aspects, one or both of UEs 210 and 215 may perform the channel measurements (e.g., measure RSSI or interference) and identify channel performance above a threshold. For example, a high RSSI or interference value may be indicative of a neighboring uplink transmission. The UE may report the high RSSI or interference value to the network or may opt to omit the information from the measurement report (e.g., the network may configure a threshold to identify uplink time resources). If the RSSI is above a threshold, this may indicate uplink transmission from another UE. In such a case, the UE may not include RSSI or interference for RSRQ or RS-SINR or may report it and the network may disregard, e.g., chock up to neighbor uplink transmission. In such a case, the UE may select a different mask for RSSI/interference measurement. In some aspects, the different mask may be UE implementation specific or configured by the base station 205.

Figure 3:
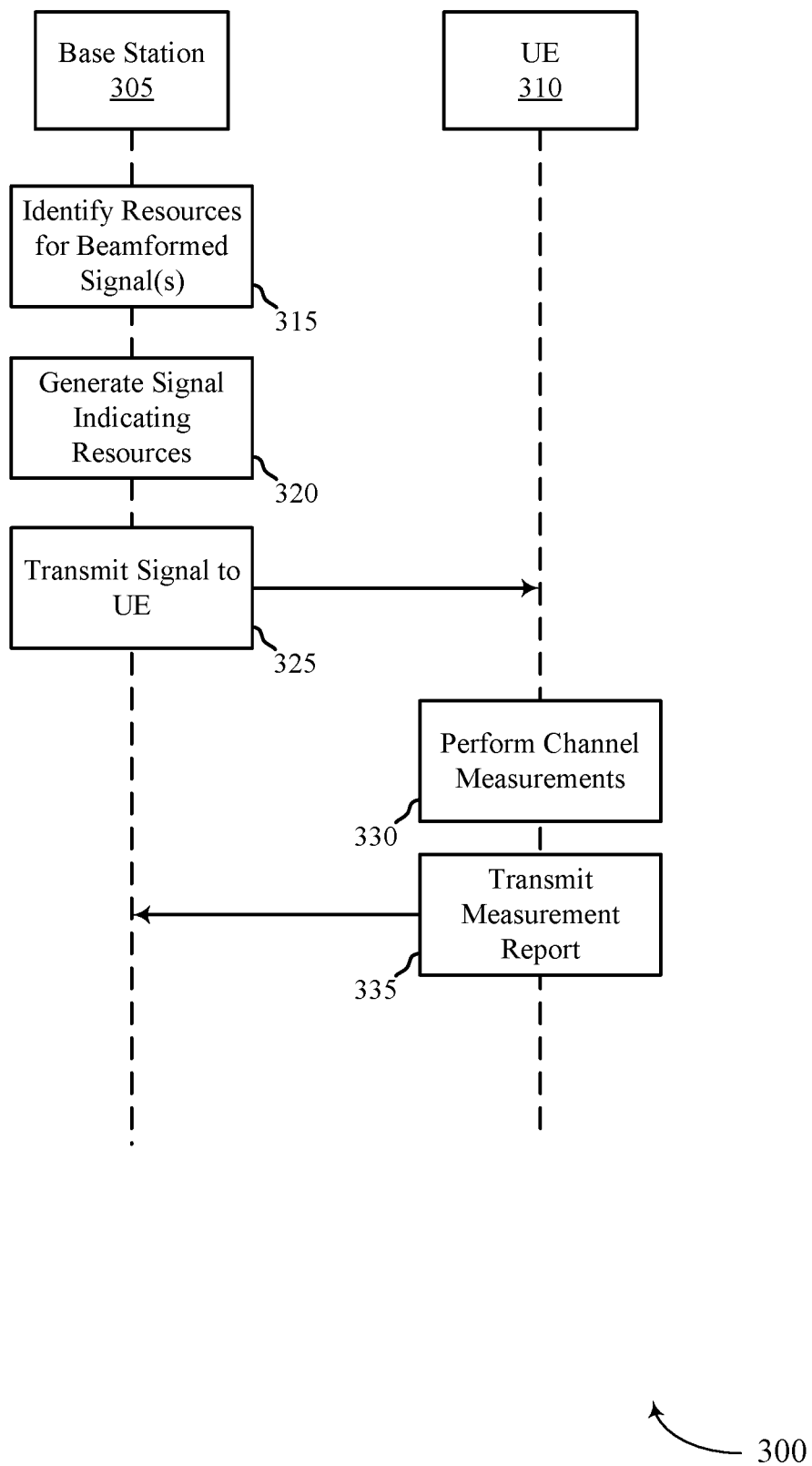
FIG. 3 illustrates an example of a process that supports resources for channel measurements in accordance with aspects of the present disclosure.

FIG. 3 illustrates an example of a process 300 that supports resources for channel measurements in accordance with various aspects of the present disclosure. In some examples, process 300 may implement aspects of wireless communication systems 100/200. Process 300 may include a base station 305 and a UE 310, which may be examples of the corresponding devices described herein.

At 315, base station 305 may identify resources allocated to or otherwise for a beamformed signal. The resources may be used by a UE (e.g., UE 310) for channel measurements on the beamformed signal. The beamformed signal may be one of multiple beamformed signals. In some aspects, base station 305 may determine that a previously received measurement report from UE 310 indicated an interference level satisfying a threshold and identify the resources based on the previous measurement report. In some aspects, base station 305 may identify resources associated with neighboring base station(s). For example, base station 305 may coordinate with the neighboring base station(s) to identify the resources, to coordinate uplink/downlink communications for a particular time period, etc.

In some aspects, the identified resources may include a time resource, a frequency resource, a time-frequency resource, or a bandwidth resource, specify a QCL information, a SFN, a slot index, a symbol index, a measurement window, or combinations thereof. In some aspects, the identified resources may be associated with a PDCCH, PDSCH, PUCCH, PUSCH, and the like.

At 320, base station 305 may generate a signal indicating at least a portion of the identified resources. In some aspects, base station 305 may identify a receive beam of the UE that was previously used for receiving a beamformed signal and include an indication of the receive beam in the signal. In some aspects, the base station 305 may generate or otherwise configure a system information signal, RRC signal, handover message, etc., as the signal indicating the at least a portion of the identified resources. In some aspects, base station 305 may apply a mask to carry or otherwise convey the indication of the identified resources. In some aspects, base station 305 may configure the signal to indicate resource(s) associated with neighboring base station(s). In some aspect, base station 305 may configure a MAC-CE, DCI, etc., to enable the channel measurements by the UE using the identified resources.

At 325, base station 305 may transmit the signal to the UE 310, and the UE 310 may receive the signal from the base station 305 indicating the resources for the beamformed signal. In some aspects, UE 310 may have transmitted a previous measurement report to the base station 305 identifying a receive beam used for measurements of the beamformed signal. The signal may also include an indication of the receive beam that the UE 310 is to use to perform channel measurements on the beamformed signal.

At 330, UE 310 may perform channel measurements of the beamformed signal using the indicated resources. In some aspects, the UE 310 may perform channel measurements on beamformed signal(s) from neighboring base station(s). e.g., based on the indication received in the signal.

At 335, UE 310 may transmit (and base station 305 may receive) a measurement report associated with the beamformed signal. In some aspects, UE 310 may determine that an interference level of the beamformed signal exceeds a threshold (e.g., due to a nearby uplink transmission) and omit the indication of the interference level from the measurement report. In other aspects, the UE 310 may include the indication of the interference level in the measurement report and the base station 305 may be configured to identify the nearby uplink transmission and therefore disregard the interference level.

Figure 4:
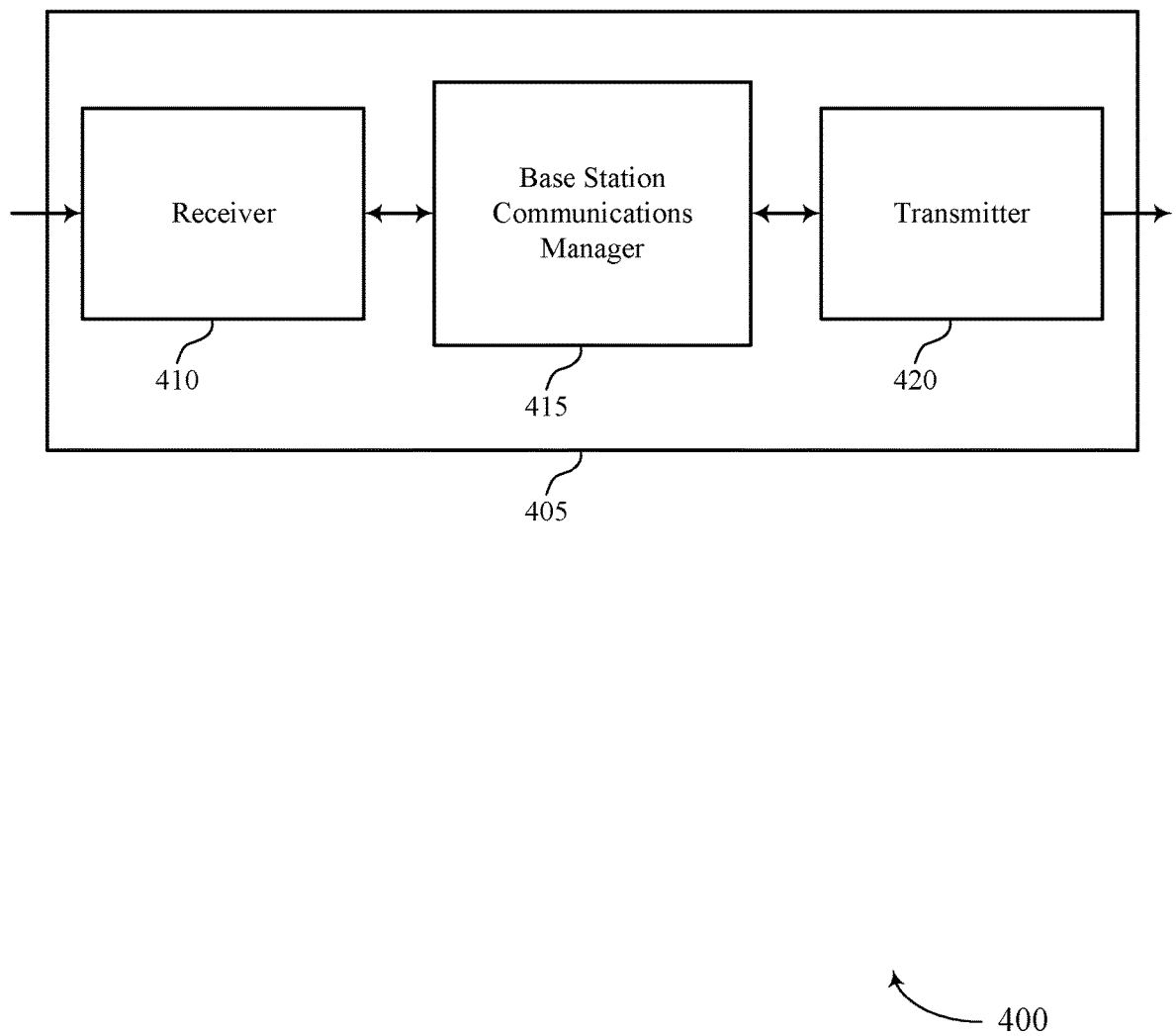
FIGS. 4 through 6 show block diagrams of a device that supports resources for channel measurements in accordance with aspects of the present disclosure.

FIG. 4 shows a block diagram 400 of a wireless device 405 that supports resources for channel measurements in accordance with aspects of the present disclosure. Wireless device 405 may be an example of aspects of a base station 105 as described herein. Wireless device 405 may include receiver 410, base station communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to resources for channel measurements, etc.). Information may be passed on to other components of the device. The receiver 410 may be an example of aspects of the transceiver 735 described with reference to FIG. 7. The receiver 410 may utilize a single antenna or a set of antennas.

Base station communications manager 415 may be an example of aspects of the base station communications manager 715 described with reference to FIG. 7.

Base station communications manager 415 and/or at least some of its various sub-components may be implemented in hardware, software executed by a processor, firmware, or any combination thereof. If implemented in software executed by a processor, the functions of the base station communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 415 and/or at least some of its various sub-components may be physically located at various positions, including being distributed such that portions of functions are implemented at different physical locations by one or more physical devices. In some examples, base station communications manager 415 and/or at least some of its various sub-components may be a separate and distinct component in accordance with various aspects of the present disclosure. In other examples, base station communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 415 may identify resources associated with a beamformed signal, the identified resources being used by a UE for channel measurements of the beamformed signal, the beamformed signal being one of a set of beamformed signals, generate a signal indicating at least a portion of the identified resources, and transmit the signal to the UE.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
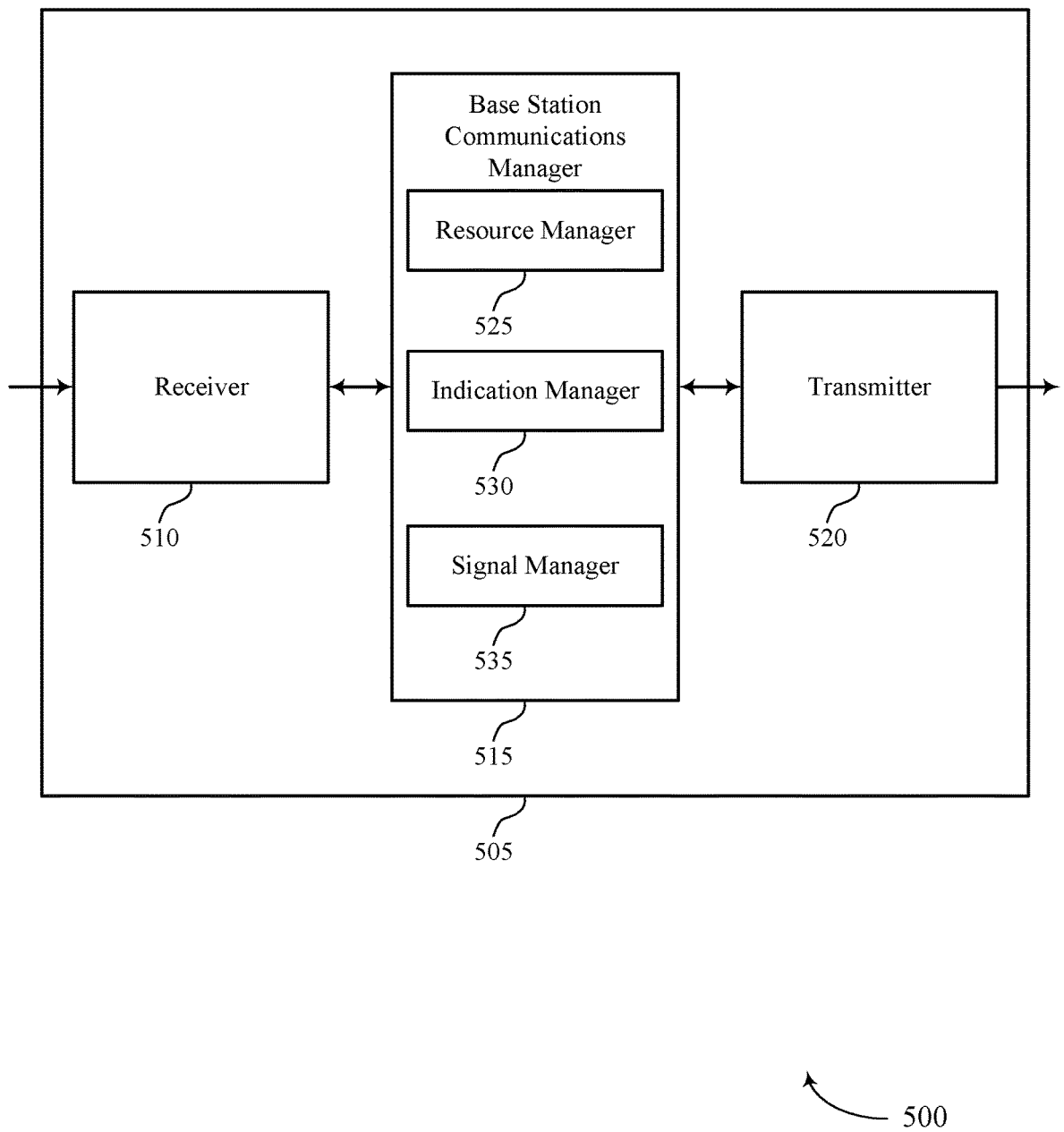

FIG. 5 shows a block diagram 500 of a wireless device 505 that supports resources for channel measurements in accordance with aspects of the present disclosure. Wireless device 505 may be an example of aspects of a wireless device 405 or a base station 105 as described with reference to FIG. 4. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to resources for channel measurements, etc.). Information may be passed on to other components of the device. The receiver 510 may be an example of aspects of the transceiver 735 described with reference to FIG. 7. The receiver 510 may utilize a single antenna or a set of antennas.

Base station communications manager 515 may be an example of aspects of the base station communications manager 715 described with reference to FIG. 7.

Base station communications manager 515 may also include resource manager 525, indication manager 530, and signal manager 535.

Resource manager 525 may identify resources associated with a beamformed signal, the identified resources being used by a UE for channel measurements of the beamformed signal, the beamformed signal being one of a set of beamformed signals. In some cases, the identified resources include at least one of: a time resource, or a frequency resource, or a time-frequency resource, or a bandwidth resource, or specifying a QCL information, or a SFN, or a slot index, or a symbol index, or a measurement window, or combinations thereof. In some cases, the identified resources are associated with at least one of: a PDCCH region, or a PDSCH region, or a PUCCH region, or a PUSCH region, or a combination thereof, of a transmission.

Indication manager 530 may generate a signal indicating at least a portion of the identified resources.

Signal manager 535 may transmit the signal to the UE and generate at least one of: a system information signal, or a RRC signal, or a handover message, or combinations therefore, as the signal indicating at least a portion of the identified resources.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
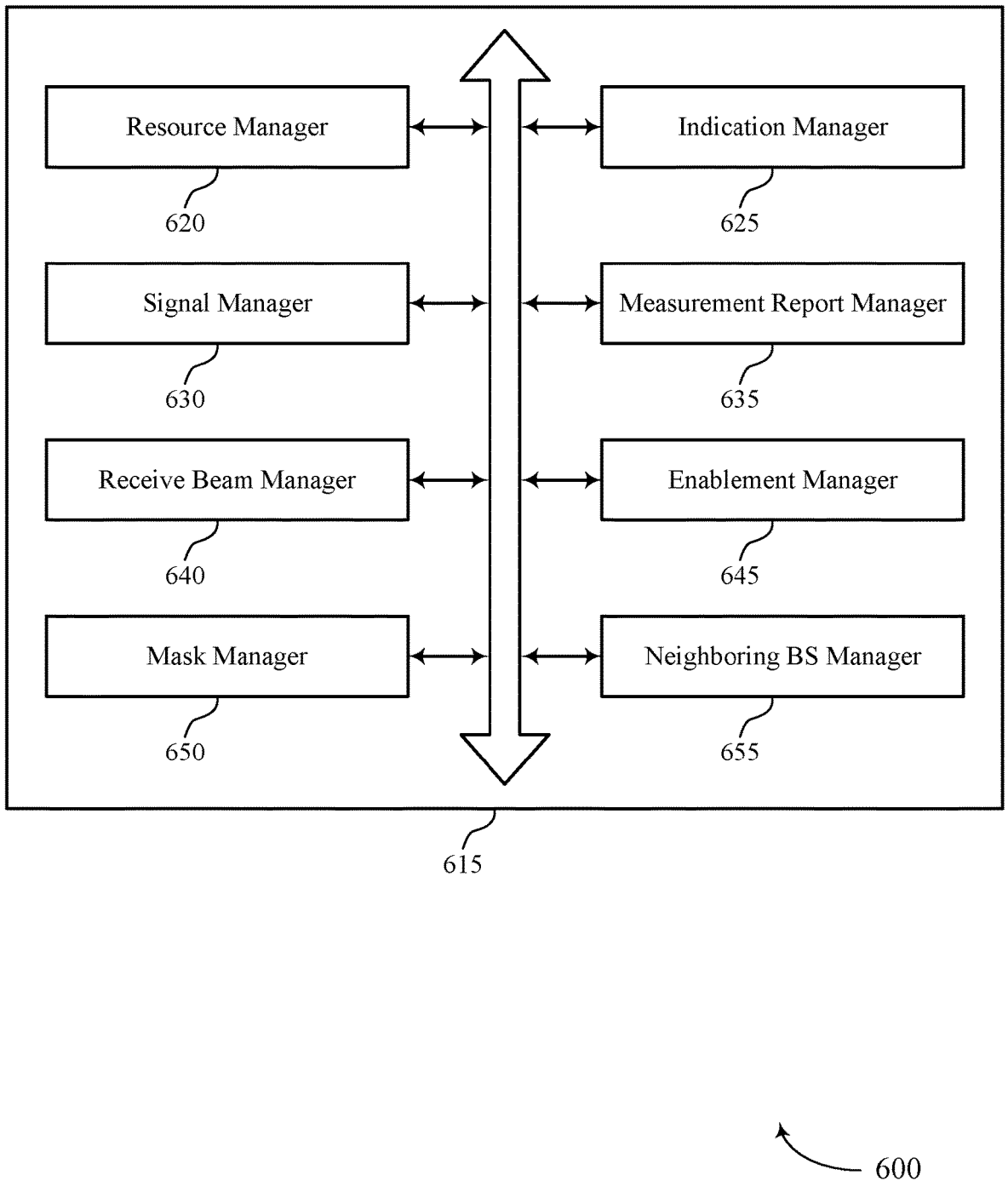

FIG. 6 shows a block diagram 600 of a base station communications manager 615 that supports resources for channel measurements in accordance with aspects of the present disclosure. The base station communications manager 615 may be an example of aspects of a base station communications manager 415, a base station communications manager 515, or a base station communications manager 715 described with reference to FIGS. 4, 5, and 7. The base station communications manager 615 may include resource manager 620, indication manager 625, signal manager 630, measurement report manager 635, receive beam manager 640, enablement manager 645, mask manager 650, and neighboring BS manager 655. Each of these modules may communicate, directly or indirectly, with one another (e.g., via one or more buses).

Resource manager 620 may identify resources associated with a beamformed signal, the identified resources being used by a UE for channel measurements of the beamformed signal, the beamformed signal being one of a set of beamformed signals. In some cases, the identified resources include at least one of: a time resource, or a frequency resource, or a time-frequency resource, or a bandwidth resource, or a specifying a QCL information, or a SFN, or a slot index, or a symbol index, or a measurement window, or combinations thereof. In some cases, the identified resources are associated with at least one of: a PDCCH region, or a PDSCH region, or a PUCCH region, or a PUSCH region, or a combination thereof, of a transmission.

Indication manager 625 may generate a signal indicating at least a portion of the identified resources.

Signal manager 630 may transmit the signal to the UE and generate at least one of: a system information signal, or a RRC signal, or a handover message, or combinations therefore, as the signal indicating at least a portion of the identified resources.

Measurement report manager 635 may receive, based on the identified resources, a measurement report associated with the beamformed signal and determine that a measurement report received from the UE includes an interference level satisfying a threshold for a subset of resources, where the identified resources are based on the subset of resources.

Receive beam manager 640 may identify a receive beam of the UE used for receiving a previous beamformed signal and generate the signal to indicate the receive beam, where the identified resources include the receive beam.

Enablement manager 645 may configure at least one of: a MAC-CE, or a DCI, or combinations thereof, to enable the channel measurements by the UE using the identified resources.

Mask manager 650 may apply a mask to a bit or field in the signal to indicate the identified resources.

Neighboring BS manager 655 may identify a set of resources associated with one or more neighboring base stations located proximate to the UE, generate the signal to indicate the set of resources, and coordinate with the one or more neighboring base stations to identify the set of resources.

Figure 7:
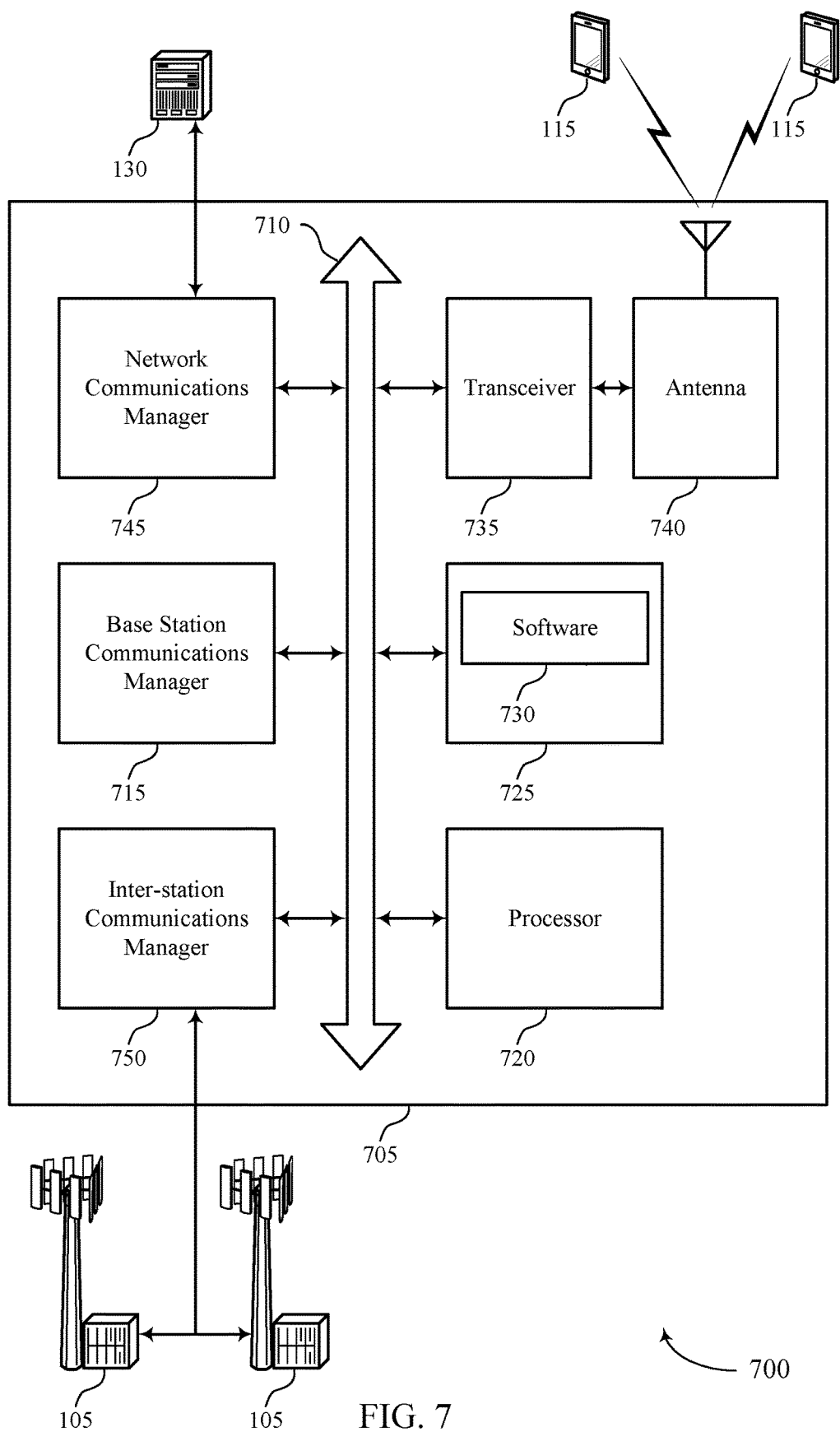
FIG. 7 illustrates a block diagram of a system including a base station that supports resources for channel measurements in accordance with aspects of the present disclosure.

FIG. 7 shows a diagram of a system 700 including a device 705 that supports resources for channel measurements in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including base station communications manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting resources for channel measurements).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support resources for channel measurements. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an LTE/LTE-A wireless communication network technology to provide communication between base stations 105.

Figure 8:
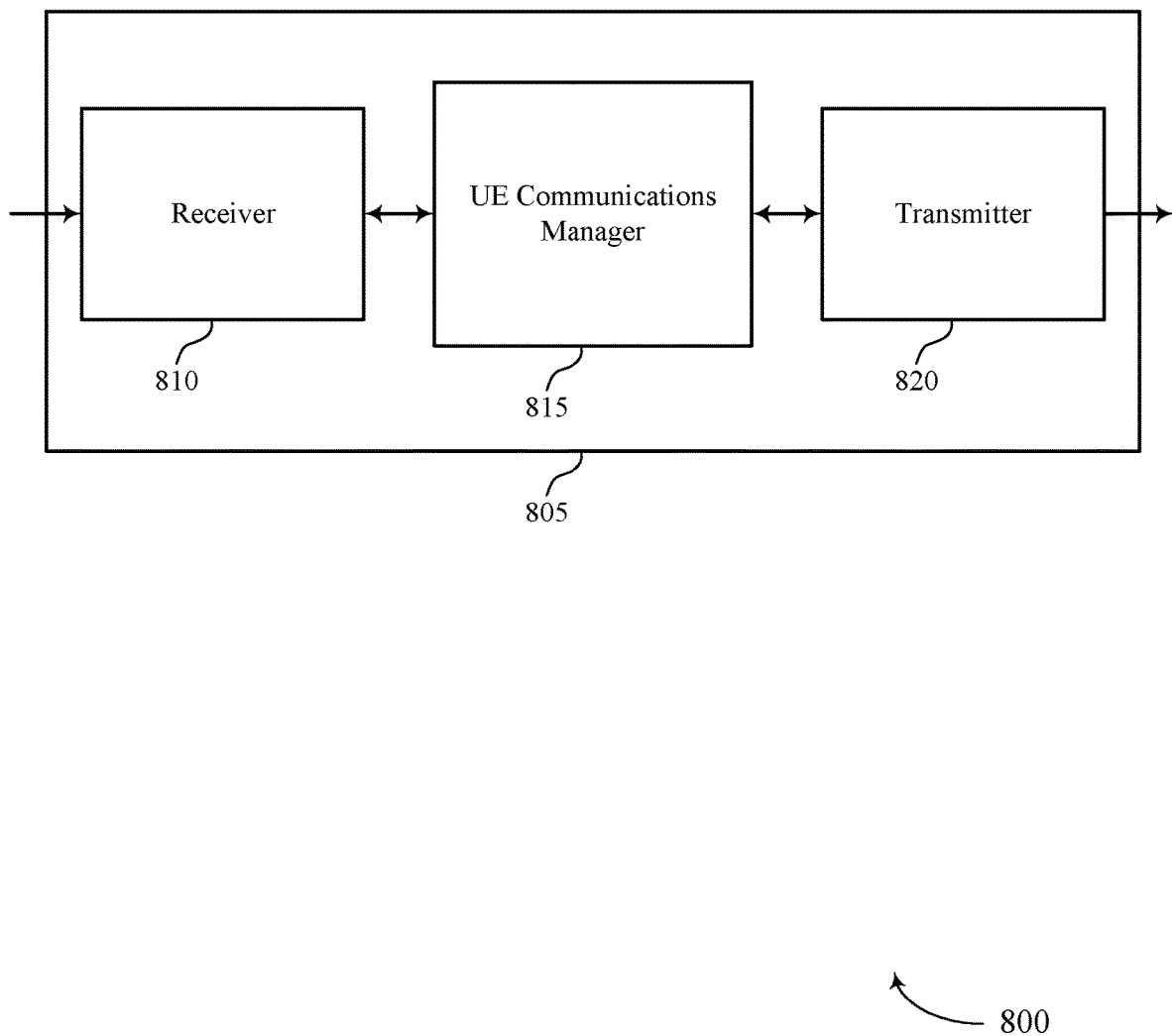
FIGS. 8 through 10 show block diagrams of a device that supports resources for channel measurements in accordance with aspects of the present disclosure.

FIG. 8 shows a block diagram 800 of a wireless device 805 that supports resources for channel measurements in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resources for channel measurements, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive a signal from a base station indicating resources for a beamformed signal within a set of beamformed signals, perform a channel measurement of the beamformed signal using the indicated resources, and transmit, to the base station, a measurement report including the channel measurement associated with the beamformed signal.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
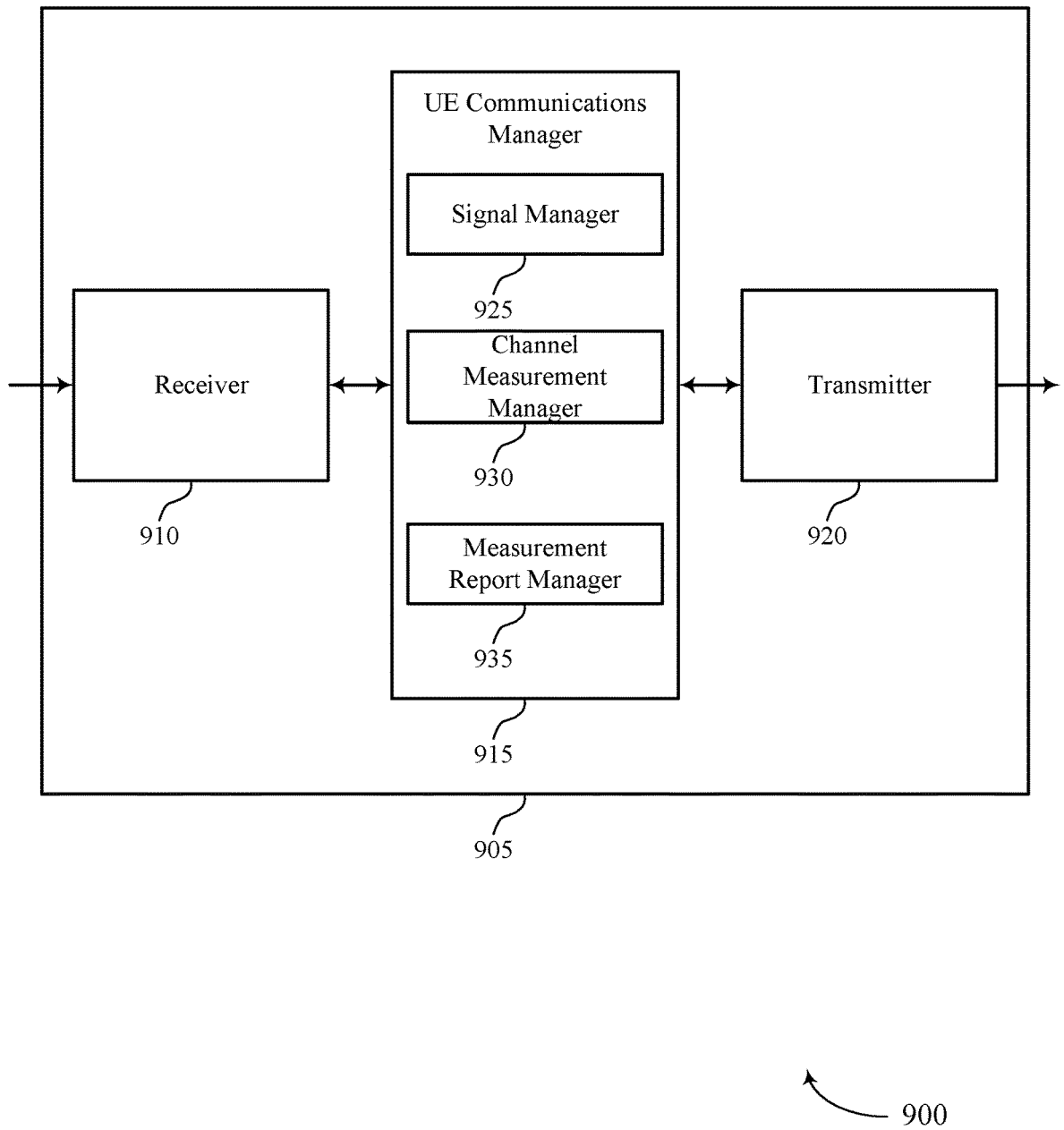

FIG. 9 shows a block diagram 900 of a wireless device 905 that supports resources for channel measurements in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to resources for channel measurements, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11.

UE communications manager 915 may also include signal manager 925, channel measurement manager 930, and measurement report manager 935.

Signal manager 925 may receive a signal from a base station indicating resources for a beamformed signal within a set of beamformed signals.

Channel measurement manager 930 may perform a channel measurement of the beamformed signal using the indicated resources.

Measurement report manager 935 may transmit, to the base station, a measurement report including the channel measurement associated with the beamformed signal.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
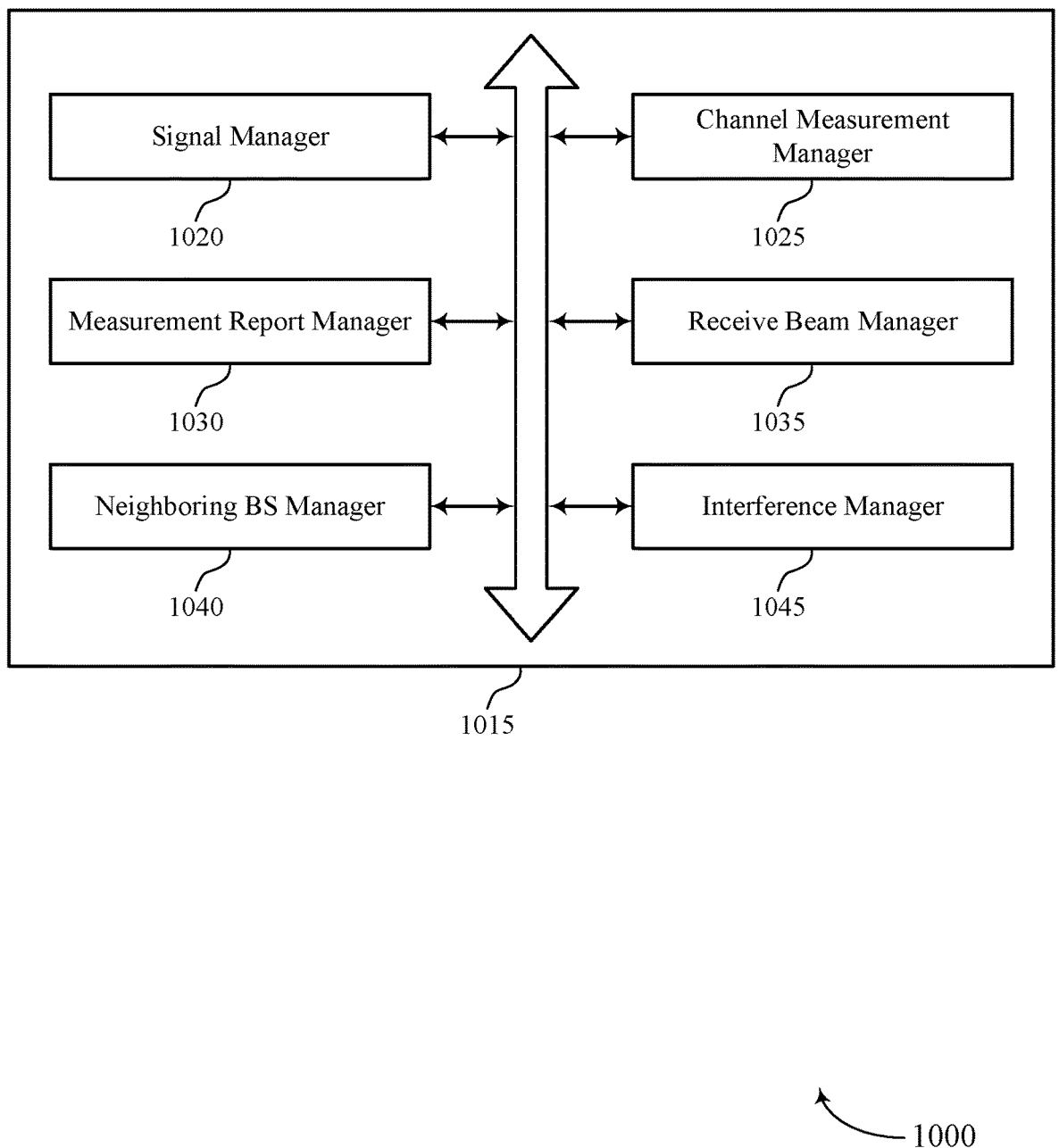

FIG. 10 shows a block diagram 1000 of a UE communications manager 1015 that supports resources for channel measurements in accordance with aspects of the present disclosure. The UE communications manager 1015 may be an example of aspects of a UE communications manager 1115 described with reference to FIGS. 8, 9, and 11. The UE communications manager 1015 may include signal manager 1020, channel measurement manager 1025, measurement report manager 1030, receive beam manager 1035, neighboring BS manager 1040, and interference manager 1045. Each of these modules may communicate, directly or indirectly, with one another (e.g., via one or more buses).

Signal manager 1020 may receive a signal from a base station indicating resources for a beamformed signal within a set of beamformed signals.

Channel measurement manager 1025 may perform a channel measurement of the beamformed signal using the indicated resources.

Measurement report manager 1030 may transmit, to the base station, a measurement report including the channel measurement associated with the beamformed signal.

Receive beam manager 1035 may transmit a previous measurement report identifying a receive beam used for measurements on the beamformed signal, where the signal includes an indication of the receive beam.

Neighboring BS manager 1040 may perform, based on the signal, the channel measurement on at least one beamformed signal from or more neighboring base stations.

Interference manager 1045 may determine, based on the channel measurement, that an interference level of the beamformed signal exceeds a threshold and omit an indication of the interference level from the measurement report.

Figure 11:
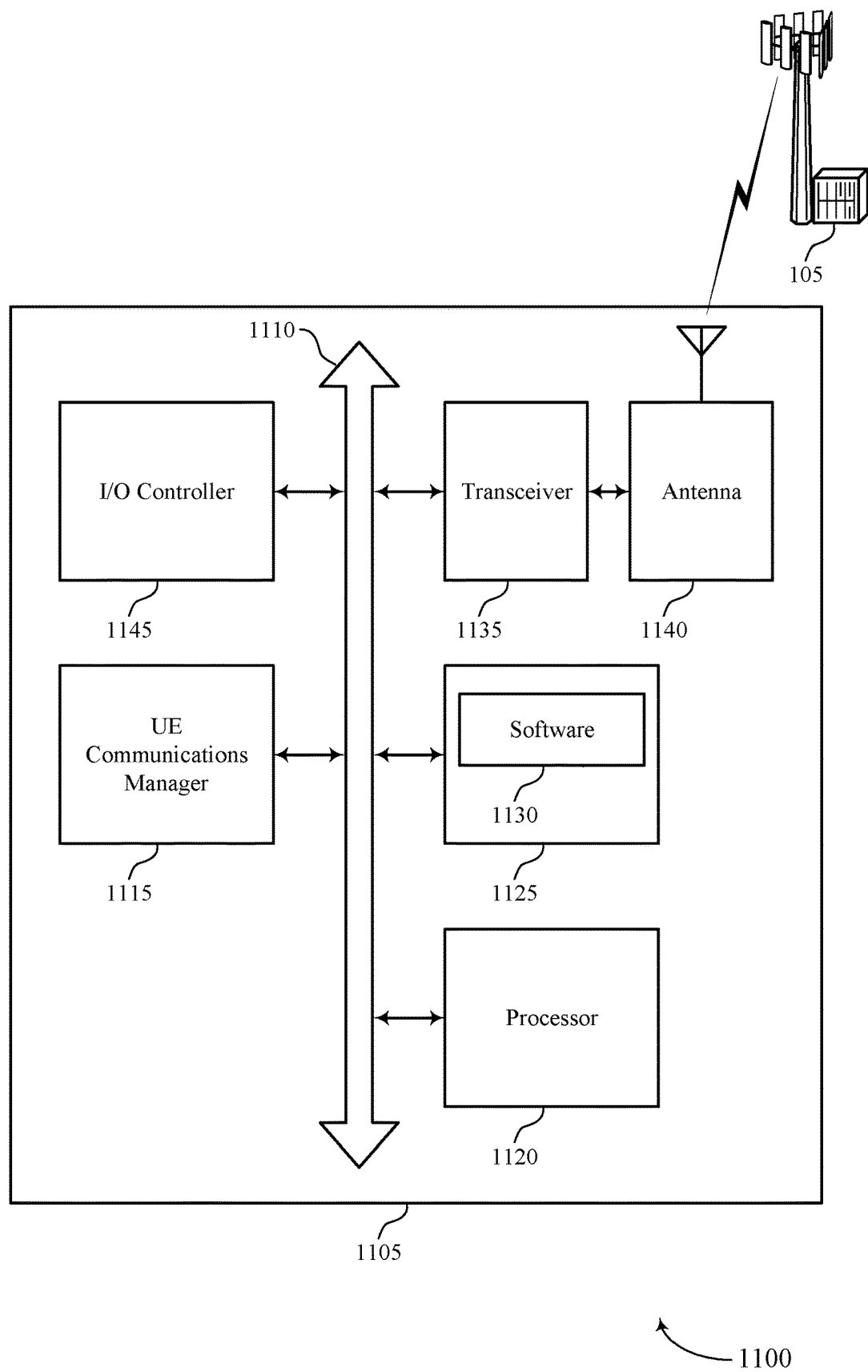
FIG. 11 illustrates a block diagram of a system including a UE that supports resources for channel measurements in accordance with aspects of the present disclosure.

FIG. 11 shows a diagram of a system 1100 including a device 1105 that supports resources for channel measurements in accordance with aspects of the present disclosure. Device 1105 may be an example of or include the components of UE 115 as described above, e.g., with reference to FIG. 1. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting resources for channel measurements).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support resources for channel measurements. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
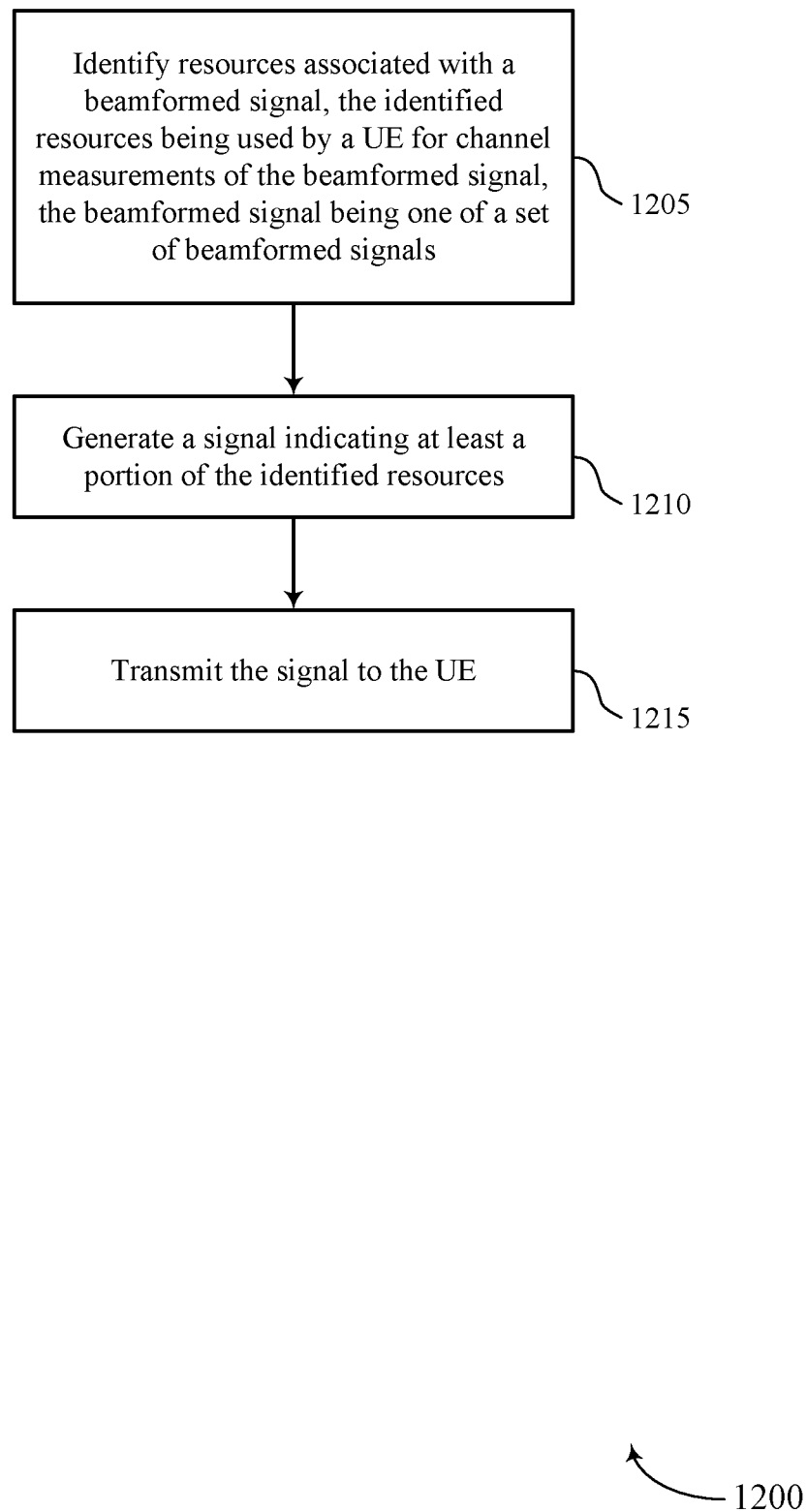
FIGS. 12 through 15 illustrate methods for resources for channel measurements in accordance with aspects of the present disclosure.

FIG. 12 shows a flowchart illustrating a method 1200 for resources for channel measurements in accordance with aspects of the present disclosure. The operations of method 1200 may be implemented by a base station 105 or its components as described herein. For example, the operations of method 1200 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1205 the base station 105 may identify resources associated with a beamformed signal, the identified resources being used by a UE for channel measurements of the beamformed signal, the beamformed signal being one of a plurality of beamformed signals. The operations of 1205 may be performed according to the methods described herein. In certain examples, aspects of the operations of 1205 may be performed by a resource manager as described with reference to FIGS. 4 through 7.

At 1210 the base station 105 may generate a signal indicating at least a portion of the identified resources. The operations of 1210 may be performed according to the methods described herein. In certain examples, aspects of the operations of 1210 may be performed by an indication manager as described with reference to FIGS. 4 through 7.

At 1215 the base station 105 may transmit the signal to the UE. The operations of 1215 may be performed according to the methods described herein. In certain examples, aspects of the operations of 1215 may be performed by a signal manager as described with reference to FIGS. 4 through 7.

Figure 13:
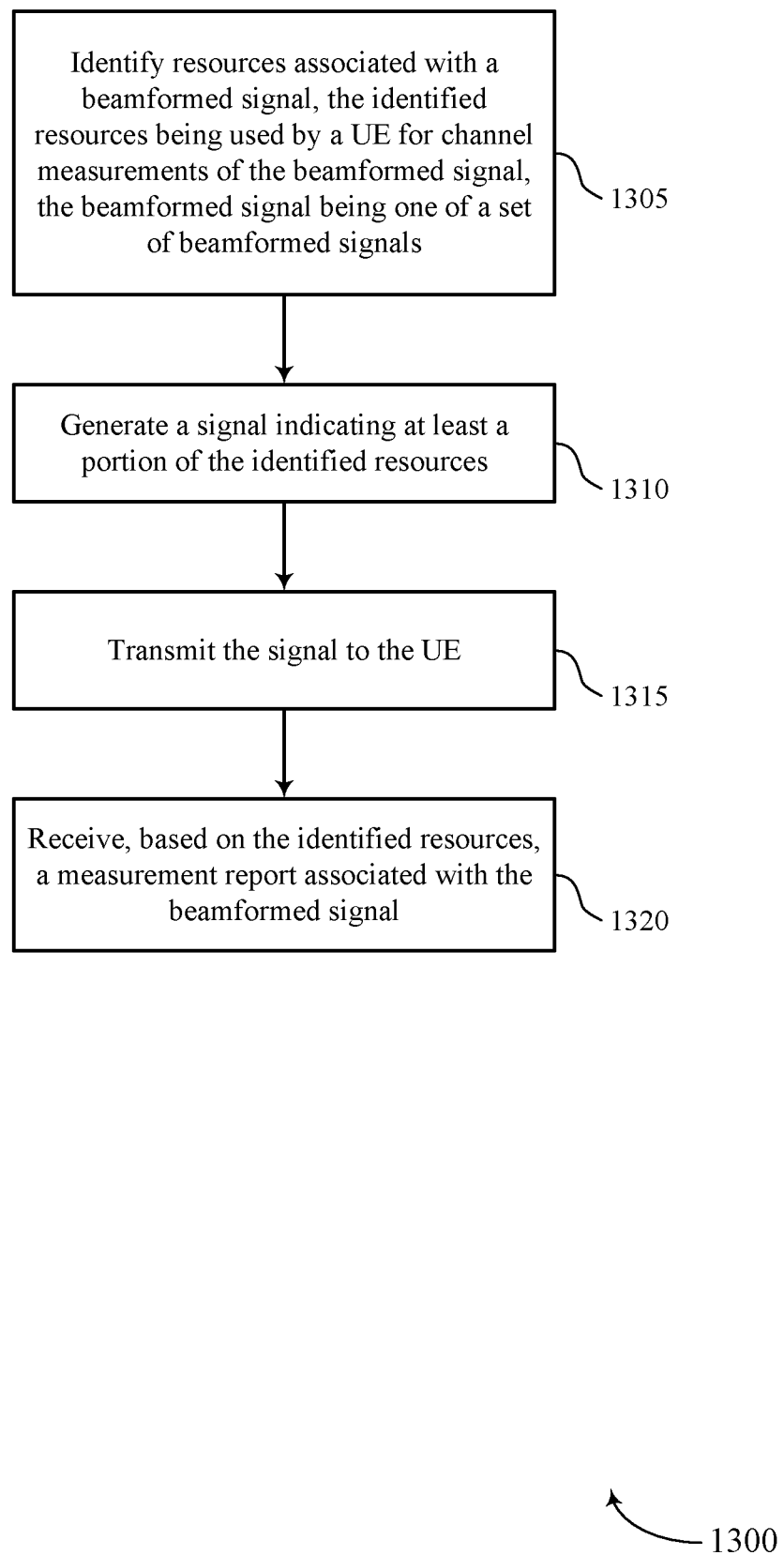

FIG. 13 shows a flowchart illustrating a method 1300 for resources for channel measurements in accordance with aspects of the present disclosure. The operations of method 1300 may be implemented by a base station 105 or its components as described herein. For example, the operations of method 1300 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may identify resources associated with a beamformed signal, the identified resources being used by a UE for channel measurements of the beamformed signal, the beamformed signal being one of a plurality of beamformed signals. The operations of 1305 may be performed according to the methods described herein. In certain examples, aspects of the operations of 1305 may be performed by a resource manager as described with reference to FIGS. 4 through 7.

At 1310 the base station 105 may generate a signal indicating at least a portion of the identified resources. The operations of 1310 may be performed according to the methods described herein. In certain examples, aspects of the operations of 1310 may be performed by an indication manager as described with reference to FIGS. 4 through 7.

At 1315 the base station 105 may transmit the signal to the UE. The operations of 1315 may be performed according to the methods described herein. In certain examples, aspects of the operations of 1315 may be performed by a signal manager as described with reference to FIGS. 4 through 7.

At 1320 the base station 105 may receive, based at least in part on the identified resources, a measurement report associated with the beamformed signal. The operations of 1320 may be performed according to the methods described herein. In certain examples, aspects of the operations of 1320 may be performed by a measurement report manager as described with reference to FIGS. 4 through 7.

Figure 14:
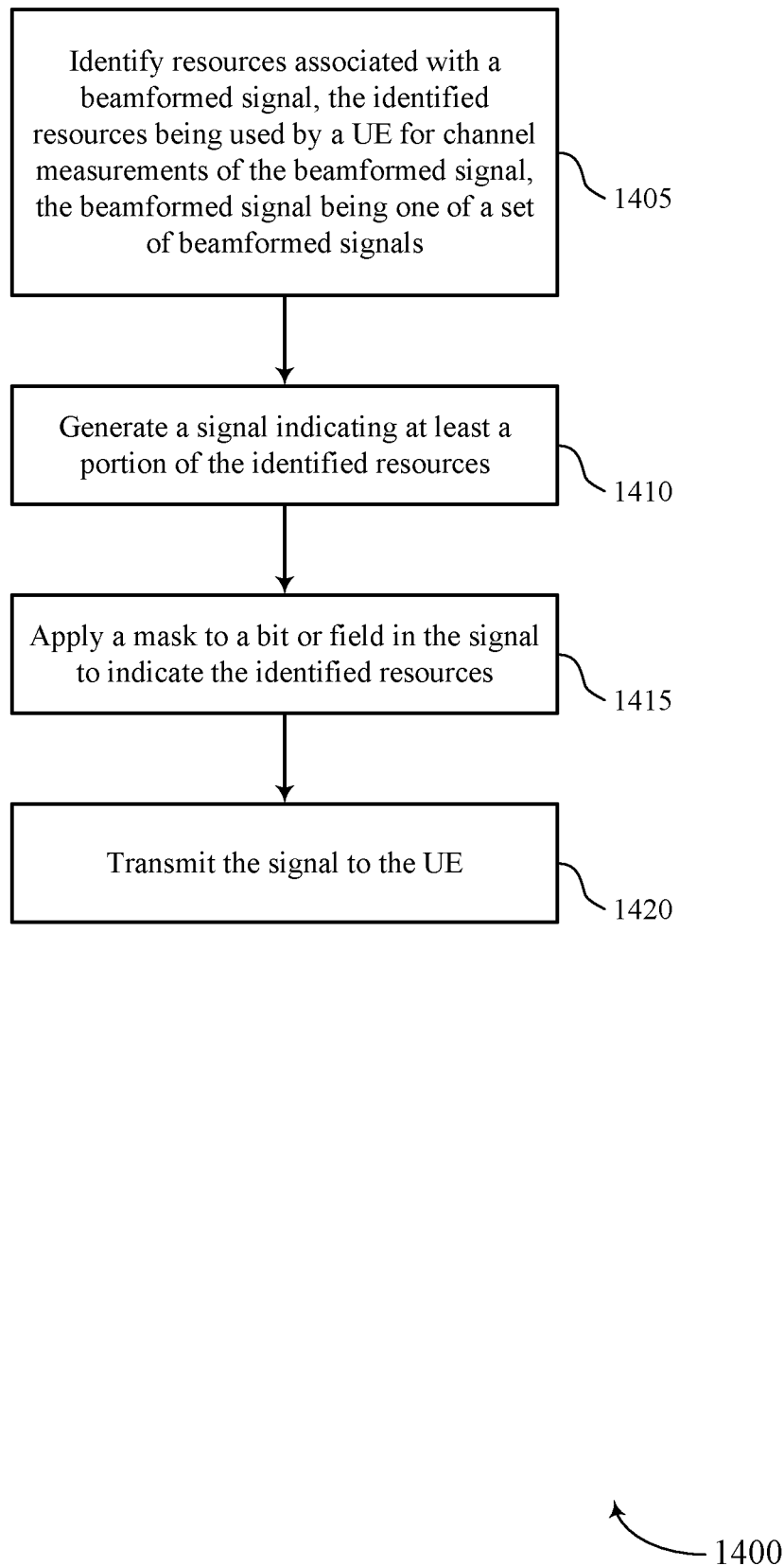

FIG. 14 shows a flowchart illustrating a method 1400 for resources for channel measurements in accordance with aspects of the present disclosure. The operations of method 1400 may be implemented by a base station 105 or its components as described herein. For example, the operations of method 1400 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may identify resources associated with a beamformed signal, the identified resources being used by a UE for channel measurements of the beamformed signal, the beamformed signal being one of a plurality of beamformed signals. The operations of 1405 may be performed according to the methods described herein. In certain examples, aspects of the operations of 1405 may be performed by a resource manager as described with reference to FIGS. 4 through 7.

At 1410 the base station 105 may generate a signal indicating at least a portion of the identified resources. The operations of 1410 may be performed according to the methods described herein. In certain examples, aspects of the operations of 1410 may be performed by an indication manager as described with reference to FIGS. 4 through 7.

At 1415 the base station 105 may apply a mask to a bit or field in the signal to indicate the identified resources. The operations of 1415 may be performed according to the methods described herein. In certain examples, aspects of the operations of 1415 may be performed by a mask manager as described with reference to FIGS. 4 through 7.

At 1420 the base station 105 may transmit the signal to the UE. The operations of 1420 may be performed according to the methods described herein. In certain examples, aspects of the operations of 1420 may be performed by a signal manager as described with reference to FIGS. 4 through 7.

Figure 15:
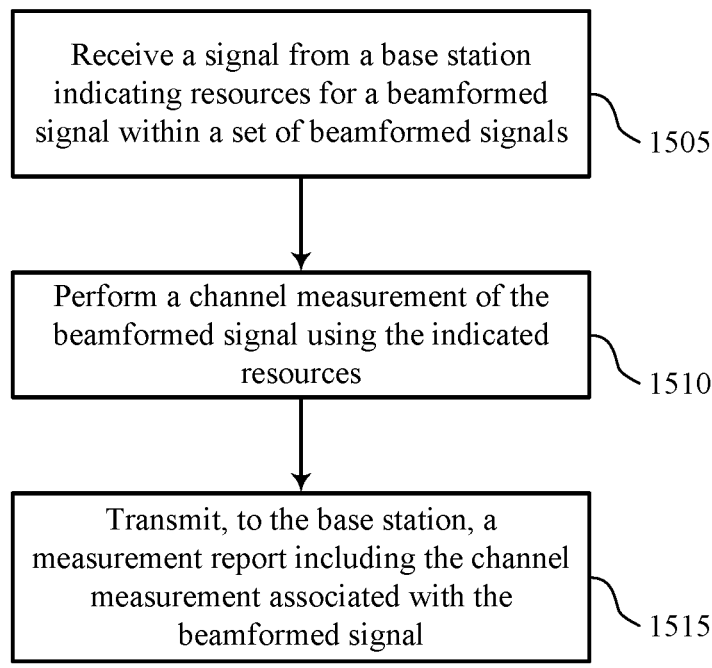

FIG. 15 shows a flowchart illustrating a method 1500 for resources for channel measurements in accordance with aspects of the present disclosure. The operations of method 1500 may be implemented by a UE 115 or its components as described herein. For example, the operations of method 1500 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a signal from a base station indicating resources for a beamformed signal within a plurality of beamformed signals. The operations of 1505 may be performed according to the methods described herein. In certain examples, aspects of the operations of 1505 may be performed by a signal manager as described with reference to FIGS. 8 through 11.

At 1510 the UE 115 may perform a channel measurement of the beamformed signal using the indicated resources. The operations of 1510 may be performed according to the methods described herein. In certain examples, aspects of the operations of 1510 may be performed by a channel measurement manager as described with reference to FIGS. 8 through 11.

At 1515 the UE 115 may transmit, to the base station, a measurement report comprising the channel measurement associated with the beamformed signal. The operations of 1515 may be performed according to the methods described herein. In certain examples, aspects of the operations of 1515 may be performed by a measurement report manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying resources associated with a beamformed signal, the identified resources to be used by a user equipment (UE) for channel measurements of the beamformed signal, the beamformed signal being one of a plurality of beamformed signals;
   generating a signal indicating at least a portion of the identified resources to be used for channel measurements, wherein generating the signal comprises applying a mask to a bit or field in the signal to indicate the identified resources, wherein the mask indicates a system frame number (SFN), a slot index, a symbol index, or a combination; and
   transmitting the signal to the UE.

2. The method of claim 1, further comprising:
   receiving, based at least in part on the identified resources, a measurement report associated with the beamformed signal.

3. The method of claim 1, further comprising:
   identifying a receive beam of the UE used for receiving a previous beamformed signal; and
   generating the signal to indicate the receive beam, wherein the identified resources comprise the receive beam.

4. The method of claim 1, further comprising:
   generating at least one of: a system information signal, or a radio resource control (RRC) signal, or a handover message, or combinations thereof, the handover message indicating at least a portion of the identified resources.

5. The method of claim 1, further comprising:
   configuring at least one of: a media access control (MAC) control element (CE), or a downlink control information (DCI), or combinations thereof, to enable the channel measurements by the UE using the identified resources.

6. The method of claim 1, further comprising:
   determining that a measurement report received from the UE comprises an interference level satisfying a threshold for a subset of resources, wherein the identified resources are based at least in part on the subset of resources.

7. The method of claim 1, further comprising:
   identifying a set of resources associated with one or more neighboring base stations located proximate to the UE; and
   generating the signal to indicate the set of resources.

8. The method of claim 7, further comprising:
   coordinating with the one or more neighboring base stations to identify the set of resources.

9. The method of claim 1, wherein the identified resources comprise at least a time resource indicated as a system frame number (SFN), a slot index, a symbol index, or combinations thereof, and further include quasi co-location (QCL) information.

10. The method of claim 1, wherein the identified resources are associated with at least one of: a physical downlink control channel (PDCCH) region, or a physical downlink shared channel (PDSCH) region, or a physical uplink control channel (PUCCH) region, or a physical uplink shared channel (PUSCH) region, or a combination thereof, of a transmission.

11. A method for wireless communication, comprising:
    receiving a signal from a base station indicating resources to be used for a beamformed signal within a plurality of beamformed signals, wherein the signal indicates the resources using a mask to a bit or field indicating a system frame number (SFN), a slot index, a symbol index, or a combination;
    performing a channel measurement of the beamformed signal using the indicated resources; and
    transmitting, to the base station, a measurement report comprising the channel measurement associated with the beamformed signal.

12. The method of claim 11, further comprising:
    transmitting a previous measurement report identifying a receive beam used for measurements on the beamformed signal, wherein the signal comprises an indication of the receive beam.

13. The method of claim 11, further comprising:
    performing, based at least in part on the signal, the channel measurement on at least one beamformed signal from or more neighboring base stations.

14. The method of claim 11, further comprising:
    determining, based at least in part on the channel measurement, that an interference level of the beamformed signal exceeds a threshold; and
    omitting an indication of the interference level from the measurement report.

15. An apparatus for wireless communication, comprising:
    a processor;
    memory in electronic communication with the processor; and
    instructions stored in the memory and executable by the processor to cause the apparatus to:
    identify resources associated with a beamformed signal, the identified resources to be used by a user equipment (UE) for channel measurements of the beamformed signal, the beamformed signal being one of a plurality of beamformed signals;

generate a signal indicating at least a portion of the identified resources to be used for channel measurements, wherein the generated signal includes a mask applied to a bit or field to indicate the identified resources, wherein the mask indicates a system frame number (SFN), a slot index, a symbol index, or a combination; and transmit the signal to the UE.

16. The apparatus of claim 15, wherein the instructions are further executable by the processor to cause the apparatus to:

receive, based at least in part on the identified resources, a measurement report associated with the beamformed signal.

17. The apparatus of claim 15, wherein the instructions are further executable by the processor to cause the apparatus to:

identify a receive beam of the UE used for receiving a previous beamformed signal; and generate the signal to indicate the receive beam, wherein the identified resources comprise the receive beam.

18. The apparatus of claim 15, wherein the instructions are further executable by the processor to cause the apparatus to:

generate at least one of: a system information signal, or a radio resource control (RRC) signal, or a handover message, or combinations thereof, the handover message indicating at least a portion of the identified resources.

19. The apparatus of claim 15, wherein the instructions are further executable by the processor to cause the apparatus to:

configure at least one of: a media access control (MAC) control element (CE), or a downlink control information (DCI), or combinations thereof, to enable the channel measurements by the UE using the identified resources.

20. The apparatus of claim 15, wherein the instructions are further executable by the processor to cause the apparatus to:

determine that a measurement report received from the UE comprises an interference level satisfying a threshold for a subset of resources, wherein the identified resources are based at least in part on the subset of resources.

21. The apparatus of claim 15, wherein the instructions are further executable by the processor to cause the apparatus to:

identify a set of resources associated with one or more neighboring base stations located proximate to the UE; and generate the signal to indicate the set of resources.

22. The apparatus of claim 21, wherein the instructions are further executable by the processor to cause the apparatus to:

coordinate with the one or more neighboring base stations to identify the set of resources.

23. The apparatus of claim 15, wherein the identified resources comprise at least a time resource indicated as a system frame number (SFN), a slot index, a symbol index, or combinations thereof, and further include quasi co-location (QCL) information.

24. The apparatus of claim 15, wherein the identified resources are associated with at least one of: a physical downlink control channel (PDCCH) region, or a physical downlink shared channel (PDSCH) region, or a physical uplink control channel (PUCCH) region, or a physical uplink shared channel (PUSCH) region, or a combination thereof, of a transmission.

25. An apparatus for wireless communication, comprising:

a processor;

memory in electronic communication with the processor; and instructions stored in the memory and executable by the processor to cause the apparatus to:

receive a signal from a base station indicating resources to be used for a beamformed signal within a plurality of beamformed signals, wherein the signal indicates the resources using a mask to a bit or field indicating a system frame number (SFN), a slot index, a symbol index, or a combination;

perform a channel measurement of the beamformed signal using the indicated resources; and transmit, to the base station, a measurement report comprising the channel measurement associated with the beamformed signal.

26. The apparatus of claim 25, wherein the instructions are further executable by the processor to cause the apparatus to:

transmit a previous measurement report identifying a receive beam used for measurements on the beamformed signal, wherein the signal comprises an indication of the receive beam.

27. The apparatus of claim 25, wherein the instructions are further executable by the processor to cause the apparatus to:

perform, based at least in part on the signal, the channel measurement on at least one beamformed signal from or more neighboring base stations.

28. The apparatus of claim 25, wherein the instructions are further executable by the processor to cause the apparatus to:

determine, based at least in part on the channel measurement, that an interference level of the beamformed signal exceeds a threshold; and omit an indication of the interference level from the measurement report.

* * * * *